United States Patent
Giannetti et al.

(10) Patent No.: US 8,602,316 B2
(45) Date of Patent: Dec. 10, 2013

(54) INCREASED EFFICIENCY HEATING SYSTEM METHOD AND APPARATUS FOR CONCRETE PRODUCTION

(76) Inventors: Robert G. Giannetti, West Caldwell, NJ (US); Robert G. Giannetti, Jr., West Caldwell, NJ (US)

( * ) Notice: Subject to any disclaimer, the term of this patent is extended or adjusted under 35 U.S.C. 154(b) by 1675 days.

(21) Appl. No.: 12/075,083

(22) Filed: Mar. 10, 2008

(65) Prior Publication Data

US 2009/0224062 A1 Sep. 10, 2009

(51) Int. Cl.
*F24H 1/00* (2006.01)
*F24H 8/00* (2006.01)
*F28D 21/00* (2006.01)

(52) U.S. Cl.
USPC .............. 237/12.1; 237/19; 237/81; 122/20 B

(58) Field of Classification Search
USPC .............................. 237/12.1, 19, 81; 122/20 B
See application file for complete search history.

(56) References Cited

U.S. PATENT DOCUMENTS

| | | | | | |
|---|---|---|---|---|---|
| 429,774 | A | * | 6/1890 | Schmidt | 237/12.1 |
| 485,988 | A | * | 11/1892 | Seigneuret | 60/320 |
| 578,031 | A | * | 3/1897 | Skvara | 60/669 |
| 1,107,534 | A | * | 8/1914 | Lovekin | 237/19 |
| 1,712,559 | A | * | 5/1929 | Holinger | 237/19 |
| 2,080,229 | A | * | 5/1937 | Ray | 122/20 B |
| 2,508,434 | A | * | 5/1950 | Storment | 585/741 |
| 3,793,992 | A | * | 2/1974 | Marquez | 122/20 B |
| 4,037,567 | A | * | 7/1977 | Torres | 122/20 B |
| 4,136,731 | A | * | 1/1979 | DeBoer | 237/19 |
| 4,175,518 | A | * | 11/1979 | Reames, Jr. | 122/20 B |
| 4,258,878 | A | * | 3/1981 | Van Pachtenbeke | 237/8 R |
| 4,373,473 | A | * | 2/1983 | Grandmont | 122/20 B |
| 4,429,661 | A | * | 2/1984 | McClure | 122/20 B |
| 4,567,350 | A | * | 1/1986 | Todd, Jr. | 392/486 |
| 4,641,631 | A | * | 2/1987 | Jatana | 126/101 |
| 4,653,434 | A | * | 3/1987 | Wilhelm, Jr. | 122/20 B |
| 4,915,297 | A | * | 4/1990 | Norman et al. | 237/8 A |
| 4,938,172 | A | * | 7/1990 | Belovarac | 237/19 |
| 5,437,264 | A | * | 8/1995 | McCormick | 122/18.2 |
| 5,572,985 | A | * | 11/1996 | Benham | 122/13.3 |
| 6,427,636 | B1 | * | 8/2002 | Liebig | 122/1 R |
| 6,564,755 | B1 | * | 5/2003 | Whelan | 122/20 B |
| 6,749,014 | B2 | * | 6/2004 | Ferraro | 237/55 |
| 7,007,742 | B2 | * | 3/2006 | Desjardins | 122/18.2 |
| 7,360,507 | B1 | * | 4/2008 | Logsdon | 122/20 B |
| 7,628,337 | B2 | * | 12/2009 | Cuppetilli et al. | 237/19 |
| 2002/0174973 | A1 | * | 11/2002 | Desjardins | 165/47 |
| 2007/0169722 | A1 | * | 7/2007 | Mannina et al. | 122/459 |

FOREIGN PATENT DOCUMENTS

JP 07217927 A * 8/1995 ............. F24D 17/00

* cited by examiner

*Primary Examiner* — Steven B McAllister
*Assistant Examiner* — Phillip E Decker
(74) *Attorney, Agent, or Firm* — Charles Brodsky

(57) ABSTRACT

In a system wherein a fossil fuel fired burner heats incoming well or municipally supplied water to a temperature required for industrial concrete production, the exhaust gases produced by the burner are utilized to preheat the incoming water to an increased temperature before the water is put into an insulated tank where the burner subsequently raises the water temperature to the required level, to thereby reduce the load on the burner and increase the efficiency of directly fired water heating systems.

8 Claims, 3 Drawing Sheets

INCREASED EFFICIENCY HEATING SYSTEM METHOD AND APPARATUS FOR CONCRETE PRODUCTION

CROSS-REFERENCE TO RELATED APPLICATIONS

None.

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

Not Applicable.

BACKGROUND OF THE INVENTION

1. Field of the Invention

This invention relates to increasing the efficiency of directly fired water heating systems, in general, and to methods and apparatus for the industrial heating of water as required for concrete production, in particular.

2. Description of the Related Art

As will be understood by those skilled in the art, commercial manufacturing processes for the production of concrete to be poured from trucks in the laying of patios and sidewalks entail the heating of incoming water. Typically available from a well or a municipal water line at some 50° F., the process involves heating the incoming water in a storage tank to a temperature over 100° F. higher. Whether the storage tank be of 10,000, 20,000, 30,000 gallon capacity or more (depending upon the size of the concrete manufacturing operation), the burners that there fire the heat exchanger in the tank usually run on No. 2 fuel oil, natural gas or propane. As is known, various temperature and valve controls regulate the flow of water into the tank and the fuel burning to bring the incoming water up to these higher temperatures uniformly as possible. In so doing, a certain amount of fuel needs to be burned, which it would be desirable to keep low in this age of ever increasing fuel costs.

3. Objects of the Invention

It is an object of the present invention, therefore, to provide a new and improved method of heating the incoming water to the temperatures required in the concrete production.

It is an object of the present invention, also, to provide the apparatus necessary to carry out this improved method—and, particularly, in a manner to allow retrofitting to the tanks already in use in the direct firing to heat the supplied water.

It is an object of the present invention, furthermore, to accomplish this no matter the size of the storage tank used, and no matter the BTU rating of the fuel burners employed.

It is yet another object of the present invention to provide this method and apparatus using readily available component parts, requiring simple installations to implement.

SUMMARY OF THE INVENTION

As will become clear from the following description, the method of the invention enables a totally automatic system in which the exhaust gas produced during the burner operation is used to preheat the supplied water into the storage tank besides heating the water stored in the tank for use in the concrete production. In this respect, instead of just venting the exhaust gas from the burner to the outside atmosphere, the exhaust gas is first used to preheat the incoming water in a separate insulated container, from which the gas is eventually vented. As will be seen below, this insulated enclosure is provided with a first flange which could be bolted to a second flange which could be easily secured to the standard vent pipe leaving the storage tank of conventional systems.

As will also become clear from the following description, the method and apparatus of the invention serves to regulate the flow of incoming water to a flow workable with the BTU rating of the burner so that the burner can raise the temperature of the water in the tank to that which is required in the concrete manufacturing production. The method and apparatus also will be seen to regulate the flow of the supplied water so as to keep the storage tank substantially always filled. In those circumstances where the temperature of the water within the tank falls below a predetermined threshold—as when the system is shut down overnight—, the method and apparatus of the present invention also serves to recirculate some of the water in the storage tank back to be preheated before inputting into the tank so as to maintain the water temperature there constant, in essentially a closed-loop feedback arrangement.

As will be appreciated by those versed in this industry—where the supplied incoming temperature of the water from a well or municipal line is at 40° F.-50° F., and where the temperature required in the concrete production process is between 140° F.-180° F., the preheating of the incoming water in accordance with the teachings of this invention serves to increase by some 20° F. the temperature of the water inputting into the tank, thereby reducing the load on the burner. An efficiency in operation of some 10-15° has been noted, essentially independent of the size of the storage tank utilized. With a construction of the invention with a storage tank of 20,000 gallon size and with a burner rated at a 47 gal/minute recovery at 100° F. rise, for example, the overall efficiency of the heating system not only increased from 84-85% to 92-95%, but resulted in a drop of the exhaust stack temperature from well over 400° F. to approximately 200° F., thus introducing less heat into the atmosphere.

BRIEF DESCRIPTION OF THE DRAWINGS

These and other features of the present invention will be more clearly understood from a consideration of the following description of the drawings, in which.

DETAILED DESCRIPTION OF THE INVENTION

Figure 1:
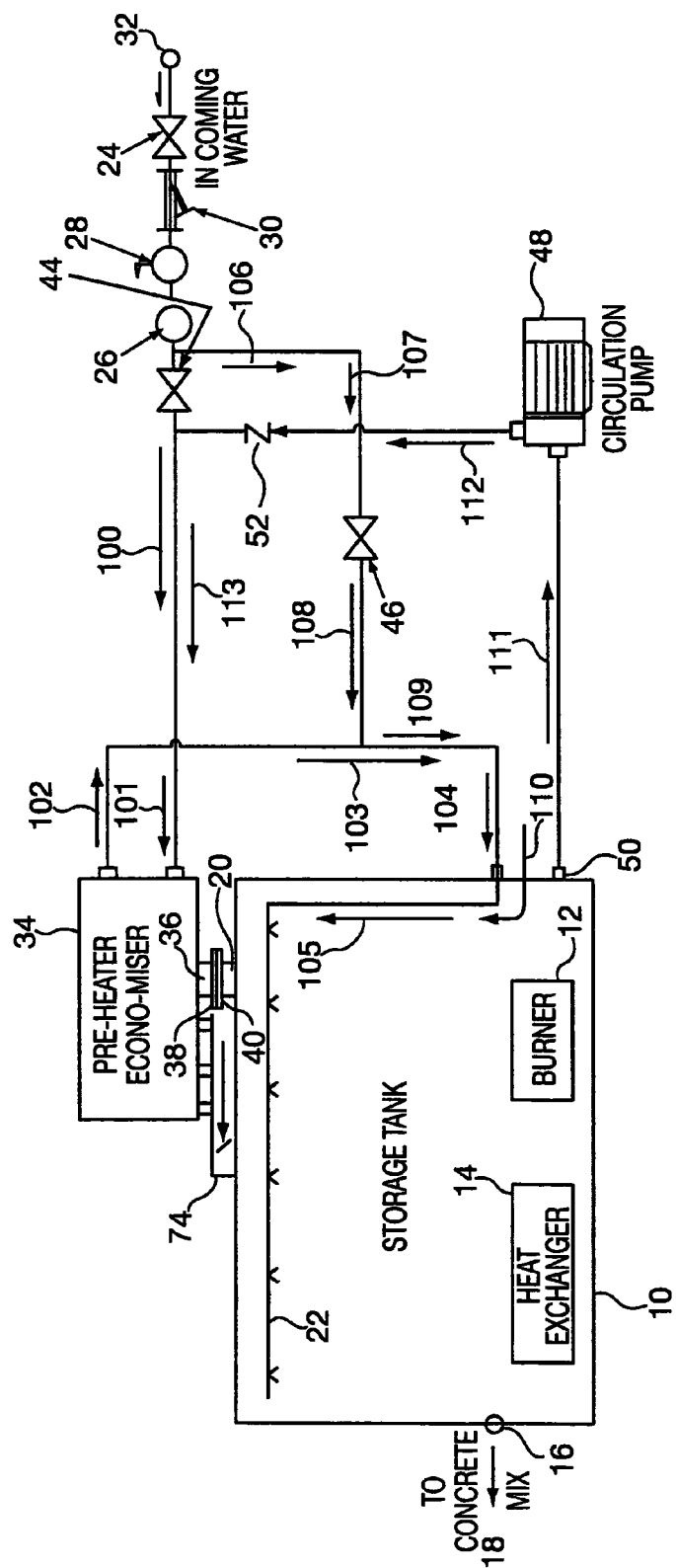
FIG. 1 represents an implementation of the apparatus of the invention, constructed in accordance with its improved method of operation.

In the apparatus of FIG. 1, an insulated storage tank 10 includes a fossil fuel burner 12 and a heat exchanger 14 to provide heated water via an output port 16 to a concrete mix in the manufacturing facility, as at 18. An exhaust for the gases produced by the burner is shown by the pipe 20—and, normally, as in prior art systems, would otherwise be vented to the atmosphere. Such storage tanks are typically of 10,000, 20,000, 30,000 gallon capacity or more, and the burner employed is of a BTU rating which identifies the number of gallons of water per minute whose temperature could be increased through burning a designated amount. The water inputted into the tank 10 enters through a spray bar 22 arranged to spread the water into the tank and over the heat exchanger 14 to eliminate the development of "hot" and "cold" spots within the tank.

The apparatus of the invention, in order to fulfill the teaching of its method, includes a water valve 24 and flow regulator 26 (both commercially available components), to be adjusted so that the water into the storage tank is supplied at a flow to which the burner 12 is rated (which, in one preferred embodiment of the invention, was at the rate of 47 gals per minute.) A solenoid valve 28 is coupled between the water valve 24 and flow regulator 26 to open or close under the control of a float (not shown) in the storage tank 10 depending upon the rise and fall of the water level in the tank. A Y-strainer—also commercially available as is the solenoid valve 28—is shown at 30 to trap any dirt, grit or other impediment in the incoming water which might damage or otherwise impair the operation of the valve 28. As will be appreciated, the incoming water supplied at 32 may be either from a well or municipal line, commonly at a temperature between 40° F. and 50° F.

The apparatus shown in FIG. 1 also includes a preheater 34 termed as an "ECONO-MISER" for its inclusion in saving fuel in the overall implementation of the system, and for reducing costs of operation. Including a heat transfer coil in the nature of a copper or brass pipe performing a similar function as a radiator in an automotive vehicle, the regulated water flows through the coil prior to being outputted into the storage tank 10. The flow path is shown by the arrows 100, 101, 102, 103, 104 and 105 to exit through the spray bar 22 onto the heat exchanger 14 in the tank. And, in accordance with the method of the invention and its apparatus, the water flowing through this pipe is heated by the exhaust gas from the stack 20, as inputted into the preheater at 36. That which are shown at 38, 40 are a pair of flanges, one of which 38 may be constructed as part of the preheater 34, and the other of which 40, would be welded to the exhaust stack of the tank, and with the two flanges 38, 40 then being bolted together (as at 42 in FIG. 2). As will be appreciated, the burner 12 not only serves then to heat the water in the tank 10, but also serves to provide its exhaust gas to preheat the water flowing from the incoming supply before it even enters the tank 10.

The apparatus of FIG. 1 also includes a pair of by-pass valves 44, 46. In usual manners of operation, the by-pass valve 44 is "closed" and the by-pass valve 46 is "opened" so that the incoming water from the well or municipal line follows the path shown by the arrows 100-105. The conditions of the valves 44, 46 can be manually reversed, however, so that the water supplied at 32 can flow directly into the tank 10, bypassing the preheater 34. Opening the valve 44 while closing the valve 46 would effectuate this—for use, for example, during hot summer whether conditions when the water in the tank is already at a relatively high temperature, or where water pressures are low and there already exists a large quantity of water in the tank to draw from. The water flow would then be represented by the arrows 106, 107, 108, 109 and 110 to the spray bar 22.

Recognizing that the concrete manufacturing production is not 24/7 and that the burner 12 typically cycles "off" and then back "on" as governed by an aquastat temperature controller, the method and apparatus of the invention goes further to protect the heat transfer coil in the preheater 34 should the burner be turned "on" venting exhaust gases into the preheater 34 at a time when no water is being inputted from the supply 32. To protect the heat transfer coil from possibly melting under such circumstances, the apparatus of the invention includes a circulation pump 48 operative in conjunction with the temperature controller to substantially simultaneously withdraw some of the water from the tank 10 and reintroduce it into the pipe so as to maintain its integrity. The output from the storage tank 10 in this respect is shown at 50, and the path for the recirculated water is shown by the arrows 111, 112 and 113. Reference numeral 52 in this regard represents a check valve to insure against the flow of water to the circulation pump 48 passing through the flow regulator 26.

Lastly, understanding that the heat of the exhaust gases about the water carrying heat transfer coil or pipe could produce a measurable degree of condensation within the preheater 34, the floor of the preheater 34 is pitched towards a drain for dispensing the condensation away.

Figure 2:
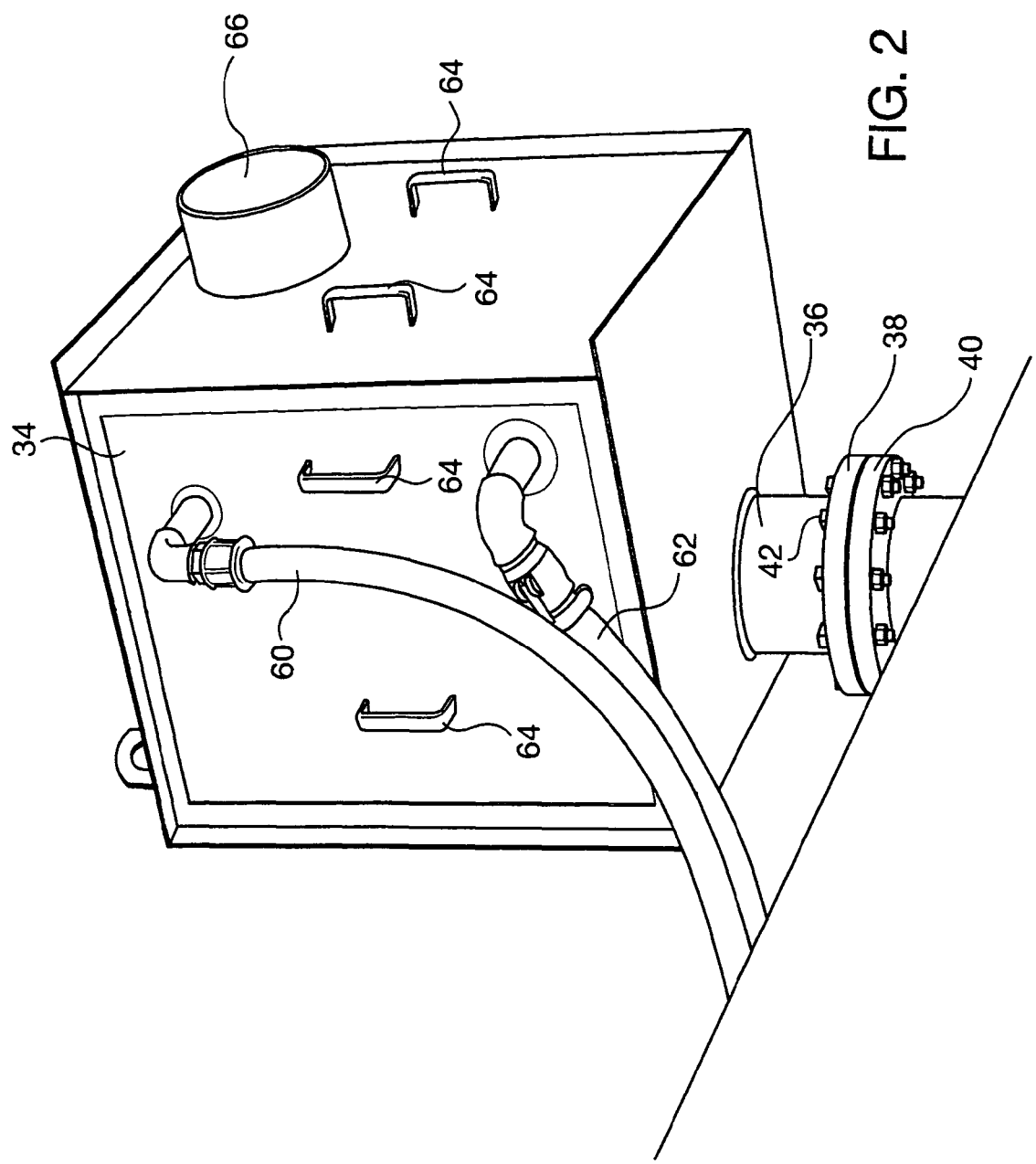
FIG. 2 illustrates a manner by which the apparatus of the invention could be coupled with an existing configuration of a direct fuel heated storage tank for concrete production.

In the representative view of FIG. 2, the input line to the preheater 34 is shown by the hose coupling 60, while that from the preheater 34 to the storage tank 10 is shown by the hose coupling 62. Reference numeral 64 shows a plurality of lifting lugs for allowing the preheater enclosure to be raised onto the storage tank 10 for mounting. Its input pipe for the exhaust gases is again shown at 36 while the gas of the burner eventually vents to the atmosphere at 66.

Figure 3:
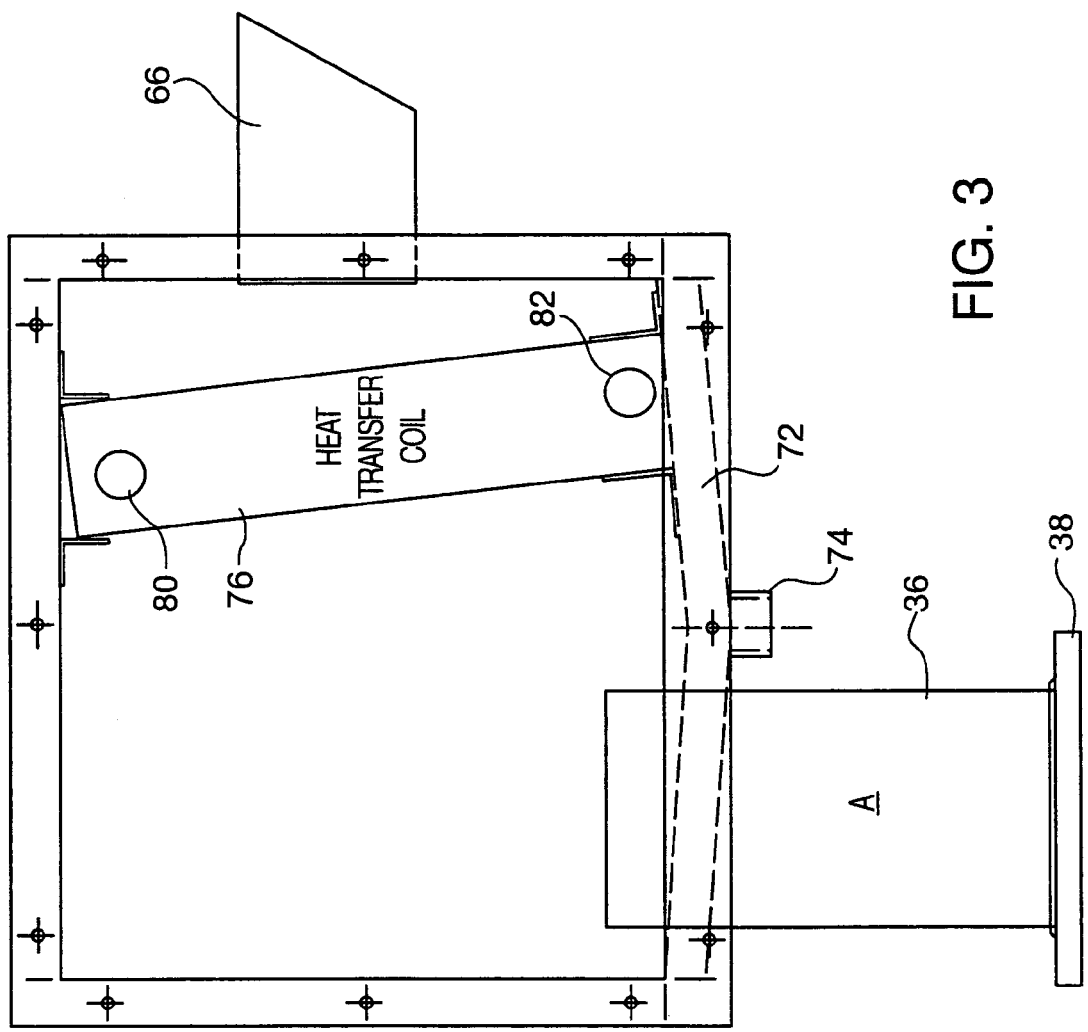
FIG. 3 is a front sectional view helpful in an understanding of one construction of a preheater helpful in an understanding of the invention.

FIG. 3, in this respect, shows the pitch of the preheater floor at 72 towards the drain 74. The heat transfer coil 76 is also sloped within its insulated enclosure to facilitate the condensate draining. The flange 38 and the input exhaust at 36 are shown, as is the exhaust to the atmosphere at 66. Reference numerals 80 and 82 identify the input ports and output ports respectively to which the hose couplings 60 and 62 connect, although the lug lifts 64 are omitted.

While there has been described a preferred method and apparatus for carrying out the invention, it will be readily appreciated by those skilled in the art that modifications can be made without departing from its teachings of instead of inputting the colder water from the well or municipal line into the storage tank and then heating the water from a direct fuel burner, the exhaust gas from the burner is first used to preheat the water so as to reduce the load on the burner. While the preferred embodiment of the invention has been utilized to increase the water temperature into the storage tank some 20° F. this way, the specific construction of the apparatus and temperature rise which results will vary depending upon the rating of the burner utilized and the size of the storage tank employed. For at least such reason, therefore, resort should be had to the claims appended hereto for a true understanding of the scope of the invention.

We claim:

1. A method for providing heater water for use in industrial concrete production comprising the steps of:
    a) supplying incoming water at a first temperature:
    b) preheating the incoming water to a second, increased temperature;
    c) inputting the pre-heated water into an insulated tank having an internal heat exchange;
    d) heating the heat exchanger with a fossil fuel fired burner having a gas exhaust stack to heat the preheated water to the temperature required in the concrete production;
    e) coupling exhaust gases developed in said stack in the fossil fuel burning in preheating the incoming water to said second, increased temperature; and
    recirculating water out of said insulated tank to be preheated a second time if the water to temperature in said tank falls below that required in the concrete production, wherein said incoming water is supplied from a well or municipal water line, wherein said incoming water is suppiled at a temperature between 40° F. and 50° F. and wherein said fossil fuel fired burner heats said pre-heated water at said second increased temperature to a further temperature of between 140° F. and 180° F. and also including the step of regulating the flow of supplied incoming water to maintain a substantially constant temperature within said insulated tank.

2. The method of claim 1 wherein the coupling of said preheated exhaust gases preheats said incoming water to a temperature 20° F. higher.

3. The method of claim 1 wherein said incoming water is heated to said second, increased temperature and to said further temperature by a fossil fuel burner fired by No. 2 fuel oil, natural gas or propane.

4. The method of claim 1, additionally including the step of regulating the flow of supplied incoming water to a rate corresponding to the BTU rating of said fossil fuel fired burner.

5. The method of claim 4, further including the step of regulating the flow of supplied incoming water to maintain a substantially filled level of water within said insulated tank.

6. A method for providing heated water for use in industrial concrete production comprising the steps of:
 a) supplying incoming water at a first temperature;
 b) preheating the incoming water to a second, increased temperature;
 c) inputting the pre-heated water into an insulated tank having an internal heat exchanger;
 d) heating the heat exchanger with a fossil fuel fired burner having a gas exhaust stack to heat the preheated water to the temperature required in the concrete production;
 e) coupling exhaust gases developed in said stack in the fossil fuel burning in preheating the incoming water to said second, increased temperature;

wherein said incoming water is supplied from a well or municipal water line;

wherein said incoming water is supplied at a temperature between 40° F. and 50° F. and wherein said fossil fuel fired burner heats said pre-heated water at said second increased temperature to a further temperature of between 140° F. and 180° F.;

regulating the flow of supplied incoming water to maintain a substantially constant temperature within said insulated tank;

regulating the flow of supplied incoming water to a rate corresponding to the BTU rating of said fossil fuel fired burner;

regulating the flow of supplied incoming water to maintain a substantially filled level of water within said insulated tank; and recirculating water out of said insulated tank to be preheated a second time if the water temperature in said tank falls below that required in the concrete production.

7. The method of claim 6 wherein the coupling of said exhaust gases preheats said incoming water to a temperature 20° F. higher.

8. The method of claim 6 wherein said incoming water is heated to said second, increased temperature and to said further temperature by a fossil fuel burner fired by No. 2 fuel oil, natural gas or propane.

* * * * *